United States Patent [19]
Paulson et al.

[11] 4,387,914
[45] Jun. 14, 1983

[54] SHORT RADIUS, LOW WEAR ELBOW

[75] Inventors: Jerome I. Paulson, Landisville; Larry W. Hess, Harrisburg, both of Pa.

[73] Assignee: Hammertek Corporation, Harrisburg, Pa.

[21] Appl. No.: 271,122

[22] Filed: Jun. 8, 1981

[51] Int. Cl.³ ............................................. F16L 55/00
[52] U.S. Cl. .................................. 285/119; 285/127; 285/179; 138/39; 406/193
[58] Field of Search ............... 285/119, 127, 183, 179; 138/39; 137/237; 406/92, 191, 192, 193, 194, 174

[56] References Cited

U.S. PATENT DOCUMENTS

| | | | |
|---|---|---|---|
| 977,740 | 12/1910 | Higgins | 285/174 X |
| 1,108,918 | 9/1914 | Lob | 285/127 X |
| 1,780,402 | 11/1930 | Recko | 285/179 X |
| 2,055,489 | 9/1936 | Groeniger | 285/179 X |
| 2,801,133 | 7/1957 | Ridley | 285/179 X |
| 2,911,235 | 11/1959 | Stumbough | 285/179 X |
| 3,942,684 | 3/1976 | Stetson | 222/3 |

FOREIGN PATENT DOCUMENTS

| | | | |
|---|---|---|---|
| 501591 | 7/1930 | Fed. Rep. of Germany | 406/193 |
| 1096830 | 1/1961 | Fed. Rep. of Germany | 406/195 |

*Primary Examiner*—Dave W. Arola

[57] ABSTRACT

An elbow is disclosed for use in effecting short radius turns in fluent transport systems while overcoming the previous problem of high wear at the turn. The subject elbow includes entry and exit ports at right angles to each other, an arcuate channel extending between the ports, and a chamber aligned with but axially offset from the entryport. The effect of this chamber is to provide abrasive resistance for the elbow by allowing a soft plug of the fluent material to form therein. The material forming the plug will rotate in a vortex manner in the chamber. The subsequently passing fluent material will deflect off of the soft plug rather than rub on the walls of the elbow while making the direction change. The elbow may be provided with an optional purge vent entering into the chamber.

10 Claims, 3 Drawing Figures

SHORT RADIUS, LOW WEAR ELBOW

The present invention relates to fluent material handling and in particular, to an elbow for effecting sharp turns, i.e., low radius, in the direction of the travel of the fluent material without having undue wear of the elbow, material breakage, and energy losses.

There has been a problem involved in the handling of fluent materials, such as grannular or particulate particles in making changes in direction of the flow of the fluent material. Heretofore, it has been necessary to make a turn, such as a right angle turn, in a long sweeping curve rather than a sharp turn. Generally, this curve has a radius which is ten times the diameter of the pipe. This long curve is necessitated by the fact that particulate material impining upon the walls of a sharp angled turn would strike a target area directly opposite the entry port and rapidly erode the wall in this area. There have been many attempts to solve this wear problem amongst which are the inclusion of inserts into the turn forming joint, the insert being a disposable item intended to wear out. Examples of this type of elbow can be found in U.S. Pat. Nos. 1,357,259; 2,911,235; and 3,942,684.

Other attempts have been made to design an elbow configuration to accommodate the flow of fluent material through a sharp angled turn. The most interesting of these can be found in U.S. Pat. No. 2,801,133 which shows an angle nozzle having a chamber with an extension forming a pocket in axial alignment with the inlet opening. When material is blown through this nozzle, a certain quantity of material will fill the pocket and serve as a pad for subsequently blown material. Thus, the pad of material that is formed serves as a wear surface, as in the case of the above-mentioned patents.

The present invention pertains to a short radius, low wear elbow capable of making sharp turns in fluent material handling lines without suffering from detrimental erosion characteristics of the prior art. The subject elbow is formed of rigid material having entrance and exit ports lying normal to each other and in close proximity. A channel extends between the face plates making a short radius right angle turn. A cavity is formed extending from the outer tangent of the turn opposite the entrance port with the axis of the cavity lying to the outside of the axis of the entryport. The cavity joins the channel at a point one quarter of the channel diameter above the axis of the channel. Material passing through the elbow from the entrance to the exit enters the cavity formed by the extension in a swirling motion with the material constantly being renewed, passed on, and absorbing the blows of the subsequent material without suffering the erosive effects thereof.

According to one aspect of the present invention, the subject elbow which will enable low radius, sharp turns to be formed in fluent handling systems without having the elbow suffer the deleterious effect of erosion.

According to another aspect of the present invention, the subject elbow incorporates a method of handling fluent material at sharp turns without resulting in a significant and/or substantial reduction in the velocity of the material movement or requiring higher energy transport levels, by creating a vortex of material which will be constantly replenished as it serves as a pad for material entering the elbow.

An embodiment of the invention will now be described by way of example with reference to the accompanying drawings, in which.

Figure 1:
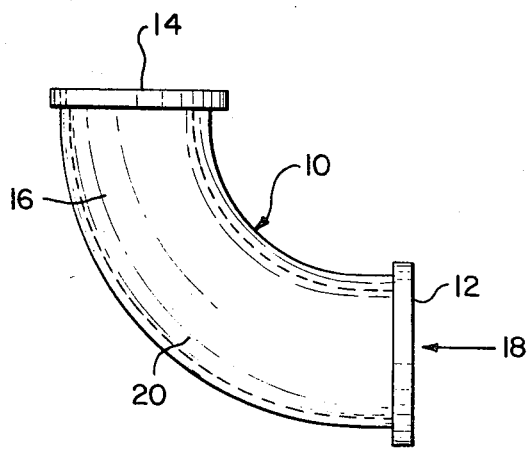
FIG. 1 is a side elevation of a conventional right angle elbow as known in the prior art.
Figure 3:
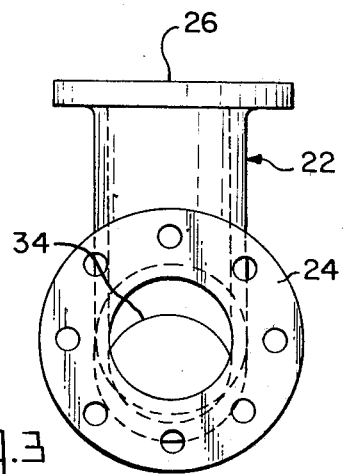
FIG. 3 is an end elevation of the subject elbow as viewed from the entry port.
Figure 2:
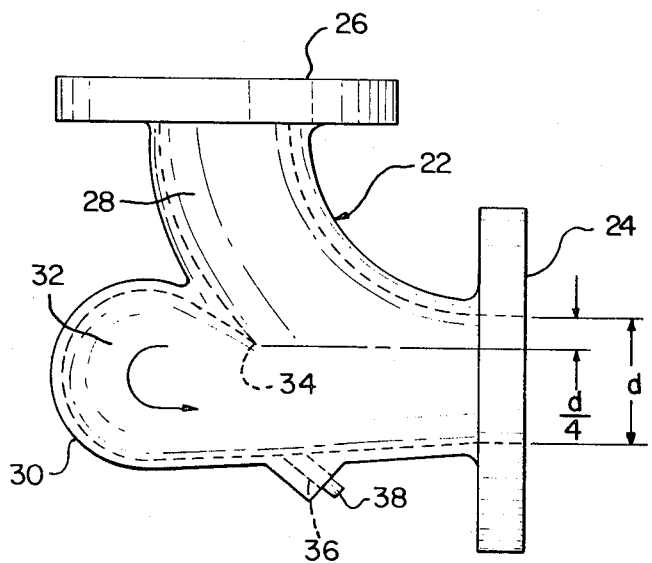
FIG. 2 is a side elevation, partially in section, of the elbow according to the present invention.

The conventional elbow 10 is shown in FIG. 1 with an entry port 12, an exit port 14, and a channel 16 extending between the ports. Material entering port 12 in the direction of arrow 18 will impinge on target area 20 causing rapid erosion of the elbow, loss of velocity of the product, and damage to the product.

The subject elbow 22 has an entry port 24, an exit port 26, and a channel 28 extending therebetween. Opposite the entry port 24 there is an extension 30 forming a cavity 32 and a line of division 34 forming an annular opening 36 axially offset from the axis of the inlet port 24. The line of division 34 is at a point one quarter of the diameter from the axis of the entryport. The elbow can be provided with an optional purge opening 36 which would normally close by a stopper 38.

The subject invention differs from conventional elbows in both appearance and in operation. The centrifugal force developed by particles going through a long radius or conventional elbow causes wear in a target zone by the abrasive movement of the particles. The intimate contact of the particles with the pipe walls also cause the particles to lose energy by friction. The high velocity impact of particles in the target zone can also cause fracturing of the product, if it is indeed fragile. The resulting reduced exit velocity can require the expenditure of extra energy to accelerate the material back to the desired conveying speed. Further, the long curved pipes require difficult piping layouts resulting in high installation costs and the requirement for usage of a great deal of space.

The theory of operation of the subject elbow is a self-forming target zone deflects particles towards the exit which eliminates wear of the elbow and loss of velocity from friction and centrifugal force. A continuously replenishing supply of material forms a slowly revolving vortice in the chamber providing a soft impact zone which prevents the breakage of fragile product. The deflected particles are quickly returned to the conveying velocity with the minimum loss of energy. The compact design also solves the above-mentioned pipe layout problems speeding both design and installation time while saving piping cost and space. The self-cleaning effect of the constantly swirling product in the vortice causes a purging action to flush clean the chamber thereby preventing cross contamination with subsequently processed product. The subject elbow functions best when operated in a dense phase, that is on the opposite side of saltation from a dilute phase, saltation velocity being the speed at which particles fall out of an air stream. In the dense phase there is the least product attrition, the lowest elbow wear and higher velocity resulting in higher energy saving per pound.

The subject elbow is preferably cast from known materials such as aluminum, cast iron, nie-hard, or stainless steel, although other materials can also be used. It is also within the purview of the invention to line the elbow with exotic ceramic or other linings. A light duty version of the subject elbow may be fabricated, but is is much more difficult to get the correct dimensions by such means. Finally, the subject elbow can be provided with mounting flanges or the like on either or both ends for attachment to pipes in a conventional fashion.

While a primary use of the subject invention is in the transport of particulate material, it also could be used in pollution control, for example in an abrasive dust handling system of the type which may be installed in a foundry.

We claim:

1. In a fluent material handling system, an elbow means for effecting small radius turns without excessive wear, velocity reduction and particle breakage, said elbow means comprising:
    an annular entry port;
    an annular exit port;
    a continuous annular channel extending between said ports in an arc; and
    a chamber formed on the outer wall on the outer arc of said channel opposite said entry port, said chamber opening into said channel on one side tangential to said channel wall with the other side of said chamber merging with said outer wall at a point outwardly offset parallel to the central axis of said inlet port by one quarter the diameter of said channel.

2. The invention according to claim 1 wherein at least one of said ports includes means for mounting said elbow means to adjacent piping.

3. The invention according to claim 1 further comprising:
    normally closed purge valve means in said chamber.

4. An elbow formed of rigid materials having an annular channel extending in a short radiused arc between an annular entry port and an annular exit port, characterized by a vortice chamber formed in the outer arcuate wall of said channel opposite said entry port, one side of said chamber being tangential to the outer edge of said channel and the opposite side merging with said outer wall forming a line of division within said channel, said line of division being outwardly axially offset from the central axis of said entry port by one quarter the diameter of said port whereby at least a portion of the material entering said elbow will swirl in a vortice configuration in said chamber deflecting following material along said channel without causing wear of said elbow, said material in said chamber reentering said channel without substantial loss of velocity.

5. An elbow according to claim 4 wherein said elbow is cast.

6. An elbow according to claim 4 wherein said elbow is fabricated.

7. An elbow according to claim 4 further comprising normally closed purge means in said chamber.

8. An elbow according to claim 4 further comprising:
    mounting means on at least one of said ports to secure associated piping thereto.

9. A method of effecting a short radiused turn in a fluent material handling system without undue erosion, loss of partical velocity or partical breakage comprising the steps of:
    providing an elbow having a conduit extending in a short radiused arc between an annular inlet port and an annular outlet port with a vortice chamber opposite said inlet port, one wall of said chamber being tangential to the outer arcuate wall of said conduit and the opposite wall of said chamber merging with said outer wall at a point offset outwardly one quarter the diameter of said annular entry port with respect to the central axis of said entry port forming a line of division between said elbow and said chamber;
    passing fluent material through said elbow in a dense phase condition,
    allowing at least a portion of said material to enter said chamber where it will swirl in a vortice forming a constantly renewed rotating pad against which subsequent material rebounds along said elbow without substantial erosion of said elbow or loss of partical velocity or damage to said particles.

10. A method of effecting sharp angled, shallow radiused turns in fluent handling systems in which each turn is formed by an elbow having an arcuate conduit extending between an annular inlet and an annular outlet, characterized by the step of:
    providing a vortice chamber in an outer arcuate wall of said conduit opposite said inlet and with one wall of said chamber being tangential to said outer wall of said conduit and the opposite wall of said chamber merging with said outer wall at a point offset inwardly, with respect to the axis of said inlet, a distance equal to one quarter the diameter of said conduit,
    whereby at least some of the particulate material entering said elbow will enter and swirl in said chamber forming a rotating renewable pad against which subsequent particles strike and are deflected along said elbow without any substantial loss of particle velocity, particle damage, or erosion of said elbow.

* * * * *